Patented June 20, 1950

2,512,338

UNITED STATES PATENT OFFICE 2,512,338

PREPARATION OF CELLULOSE ETHERS

Eugene D. Klug, Wilmington, and Harold M. Spurlin, Marshalliton, Del., assignors to Hercules Powder Company, Wilmington, Del., a corporation of Delaware No Drawing. Application April 29, 1947, Serial No. 744,780

9 Claims. (Cl. 260—231)

This invention relates to the preparation of carboxyalkyl ethers of cellulose and, more particularly, to a method for adjusting the viscosities of carboxyalkyl ethers during their preparation by the slurry process.

The viscosity of carboxyalkyl ethers in certain solvent solutions largely determines their utility in industrial applications. Heretofore, viscosity of such ethers has been regulated in a number of ways. According to one method a special cellulose having the requisite degree of polymerization is used to produce each viscosity type. This is highly undesirable since a special type of cellulose must be kept on hand for each viscosity type of carboxyalkyl ether to be prepared. Furthermore, in the preparation of cellulose of extra low degree of polymerization there is generally a loss of some of the cellulose with consequent increase in cost.

According to another method of regulating viscosity of carboxyalkyl ethers the alkali cellulose is aged in the presence of air. In order to be effective the aging must be carried out for several hours, and often as long as two days. This is disadvantageous because of the long time required for the degradation of the cellulose and the consequent slowing down of the process. Furthermore, the exact control of time, temperature, caustic concentration, etc., required because of the sensitivity of cellulose to these influences is very difficult to attain and is often inadequate under the best of conditions.

Still other methods involve hydrolysis of the ethers by heating in the presence of acids and the addition of air or oxygen to the ethylation reactor. Hydrolysis is undesirable since it results in the formation of products which are usually unstable, the acid treatment apparently removing certain stabilizing constituents of the cellulose ether. Addition of air or oxygen is quite effective but is of limited usefulness due to the fact that control of the viscosity is not good, i. e., it is difficult to obtain products of exactly the viscosity required.

The addition of hydrogen peroxides, and the alkali-metal hypobromites, hypochlorites, hypoiodites, peroxides or periodates to the etherification mix has been suggested and gives good viscosity control in the so-called "dough" process in which cellulose is reacted with a carboxyalkyl etherifying agent in the presence of free alkali and water. However, in the slurry process for manufacturing carboxymethylcellulose involving the use of a diluent, such as isopropanol, in the reaction mix, addition of these materials does not seem to produce the same high degree of viscosity control as in the dough process.

Now in accordance with this invention, the difficulties hereinabove mentioned are overcome and the viscosity of carboxyalkyl ethers of cellulose is regulated by etherifying cellulose in the presence of a peroxide-producing material and a soluble compound of a metal such as manganese, cobalt, iron or lead. The invention is particularly effective in the production of carboxyalkyl ethers of cellulose by the slurry or fibrous process in which cellulose is reacted in the presence of free alkali with a carboxyalkylating agent in a medium comprising sufficient isopropyl alcohol or tert-butyl alcohol to maintain the carboxyalkyl cellulose formed, in the solid, suspended state throughout the entire reaction. In carrying out the invention, the other ingredients of the etherifying mixture are chosen so that the peroxide and metal compound do not react substantially therewith, only the viscosity of the cellulose ether being affected by the presence of said compounds.

The invention will be illustrated by the following typical examples of the preparation of carboxymethylcellulose, which is representative of cellulose carboxyalkyl ethers generally. All parts are by weight unless otherwise specified.

Example 1

Thirty parts of high viscosity type cellulose was suspended in 526 parts of isopropanol and 79 parts of water. The resulting slurry was vigorously stirred while 150 parts of a 20% aqueous solution of sodium hydroxide, containing 6.5 parts per million manganese (32.5 parts per million based on the cellulose) added as manganous sulfate, was added over a period of one-half hour. Then 0.43 part of a hydrogen peroxide solution containing 26.3 grams of hydrogen peroxide per 100 cc. of solution was added. The mixture was stirred for one-half hour and a solution of 35 parts monochloracetic acid in 27.5 parts of anhydrous isopropanol added over a period of one-half hour. The reaction mixture so obtained was then heated from room temperature to about 55° C. in one hour and kept at 55° C. for four additional hours, agitation being continued throughout the reaction. The reaction medium was then drained off and the fibrous reaction product stirred in 70% methanol (30% water) and neutralized, while in suspension, with acetic acid. The neutralized product was then drained and washed with aditional 70% methanol and dried. A 2% aqueous solution of the product was clear, fiber free, and had a viscosity of 32 centipoises.

The effect of omitting manganese and peroxide from the reaction mixture was determined by duplicating the above reaction in all respects except that the manganese and peroxide were omitted. The product obtained had a viscosity of 3400 centipoises in 2% aqueous solution.

*Examples 2–6*

Five examples were carried out under the same conditions and with the same materials and proportions as in Example 1 except that the amount of peroxide was four times as great and the amount of manganese was varied to show the effect on the viscosity of the final product. The results are set forth in the table below and illustrate clearly the possibilities of viscosity control of final product obtainable by predetermined variation of the amount of manganese.

TABLE

| Example | Manganese P. P. M. Based on the Cellulose | Viscosity of Final Product 2% Solution (C. P. S.) |
| --- | --- | --- |
| 2 | 0.0 | 1,100 |
| 3 | 1.0 | 525 |
| 4 | 11.0 | 60 |
| 5 | 32.5 | 20 |
| 6 | 85.0 | 12 |

When the above reactions were duplicated omitting manganese and peroxide the resulting product had a viscosity of 3400 centipoises in a 2% aqueous solution.

*Example 7*

In this example the conditions of treatment and materials used were the same as in Example 1 except that the manganese was replaced by 85 parts per million of cobalt (based on the cellulose) added as cobaltous chloride. The product had a viscosity of 13.5 centipoises in a 2% aqueous solution as compared to a viscosity of 3400 centipoises in a 2% aqueous solution when no peroxide and no cobalt were included.

*Example 8*

In this example the procedure and materials used were the same as in Example 1 except that the hydrogen peroxide was replaced by 1 part of sodium peroxide and the manganese by 255 parts per million of iron (based on the cellulose) added as iron chloride. The product had a viscosity of 122 centipoises in a 2% aqueous solution as compared to a viscosity of 1100 centipoises in a 2% aqueous solution when no iron was included.

It is apparent from the above examples that the use of a peroxide-producing material and a salt of a metal such as manganese or cobalt is quite effective in regulating the viscosity of carboxyalkyl ethers made by the fibrous or slurry process. Hydrogen peroxide is particularly suitable and may be added to the cellulose etherification reaction mixture in the form of concentrated aqueous solutions such as are commercially available. Other peroxides, including alkali metal peroxides, such as sodium peroxide and other peroxide-producing materials, are likewise suitable and may be added in the solid form or as aqueous solutions. The metals which have been found to function most effectively in the process in combination with the peroxide are manganese and cobalt. These are preferably added as a solution of the metallic salt such as manganous sulfate, potassium permanganate, cobaltous chloride, the naphthenates, resinates, acetates, etc. Salts of iron and lead such as the chlorides, naphthenates, resinates, etc., are also quite effective and may be used in accordance with the teachings of this invention. These two types of compounds, i. e., peroxide and metal salts, have been found to be suitable for addition to the cellulose etherification mixture since they cooperate to effectively reduce the viscosity of the ether and since any unused material and/or by-products may be readily removed during subsequent treatment.

The viscosity-regulating agents according to this invention may desirably be added at the beginning of the etherification step or during the early stages of etherification. Preferably these materials are added during the preparation of the etherification mixture as set forth in the examples.

The peroxide and metal will be added to the reactants in amounts such that a desired viscosity of the product is obtained. Since the viscosity of the product varies sharply with the proportions of these materials present and since the proportions of such materials present may be exactly determined, the proper amounts to use in a particular case in order to obtain a predetermined viscosity characteristic may be readily determined by trial. Generally, it has been found that viscosities may be controlled most effectively by varying the amount of the metal salt while maintaining the amount of peroxide constant. This is illustrated in Examples 2–6 wherein very effective viscosity regulation is obtained by holding the amount of peroxide constant and varying the amount of manganese. However, satisfactory results may also be obtained by other variations of the ingredients, determinable by trial, as pointed out above. The amount of peroxide utilized may be varied from about 0.03 to about 15% expressed as per cent $H_2O_2$ based on the cellulose, and the metal from about 0.01 to about 200 parts per million based on the cellulose. Optimum results are obtained when the peroxide is within the range 0.15 to 5% and the metal within the range of 0.1 to about 100 parts per million, hence these ranges are preferred.

In carrying out the present invention, the etherification reaction mixture will generally consist of cellulose, alkali, water, etherifying agent, an inert diluent, a peroxide and a metal. The cellulose utilized preferably has a high degree of purity and may desirably comprise cotton linters, since these are usually available in readily etherifiable condition and are a highly pure form of cellulose. However, other cellulosic materials such as highly purified wood pulp preferably containing a high alpha cellulose content, may be utilized.

The etherification agent may be chloracetic acid, other halogenated lower fatty acids, such as chloropropionic acid, chlorobutyric acid, and salts thereof with sodium, potassium and the like. The corresponding bromine and iodine compounds are also suitable. It may be added as the free acid or as a salt, due allowance being made for the consumption or lack of consumption of alkali already present. The quantity of etherifying agent will be varied with the substitution desired in the product and in general will be between about 0.01 and about 3.0 parts per part of cellulose. The proportion of etherifying agent to free alkali present may also be a factor in determining substitution. In most cases it is preferable to have present about 0.5 mole to about 1.0 mole of etherifying agent per mole of free alkali.

The alkali present will usually be sodium hydroxide, although any of the strong alkali hydroxides are suitable. When the etherifying agent is added in the form of free acid, sufficient alkali must, of course, be provided for neutralization of the acid above and beyond that required for bringing about the etherification reaction. The amount and concentration of alkali with respect to water are factors governing the final substitution of the product. Any amount of alkali may be used as long as a product insoluble in the medium is obtained. Ordinarily the ratio of alkali (as sodium hydroxide) to cellulose varies from about 0.1 part to about 2.0 parts per part of cellulose. The ratio of alkali (as sodium hydroxide) to water usually varies from about 0.02 to about 1.0 part of sodium hydroxide per part of water. These ratios refer to free alkali above that consumed for neutralizing acid etherification agents.

The inert diluent should combine substantial inertness toward the reactants with ability to take up water from the other reactants while maintaining a condition of nonsolvency for the product. Preferred materials for this purpose are isopropyl alcohol and tertiary butyl alcohol. These will be used in quantities sufficient to prevent the product from going into solution in the reaction medium. This is a minimum. Generally, more will be used to provide for free agitation of the mixture. Satisfactory ratios vary from 5 parts to 50 parts of alcohol for each part of cellulose. Preferred ratios are from 15 to 30 parts of alcohol per part of cellulose.

The reaction may be carried out by merely mixing the ingredients in the etherification reaction medium. Usually, the cellulose is first suspended in the alcohol reaction medium, a solution of alkali containing the metal added, the peroxide added, and the etherification agent then added as a solid or dissolved in water or the medium. The reaction mixture may then be stirred until the desired reaction has been completed. Usually, the mixture is heated at some temperature between 25° and 100° C. to hasten the reaction. At temperatures of the order of 50°–75° C. a reaction time of 2–6 hours is usually sufficient.

The product is recovered by draining off or otherwise removing reaction medium, purifying the product in a nonsolvent such as methanol, to leach out by-products, and at the same time neutralizing free alkali with acetic acid, draining off the mixture, washing with additional methanol and drying. The product is in fibrous form and has the desired viscosity characteristics as determined by the quantities of peroxide and metal added.

The product, purified as above outlined, will usually retain some manganese. For most applications this amount of manganese is so small that it is not objectionable. However, in cases where it is objectionable, it may be removed by washing the product with slightly acidified 70% methanol. Reducing agents such as sodium bisulfite, hydroxylamine, iodine, oxalic acid, etc., may be used to solubilize manganese by reducing it to the divalent stage. These reagents are, of course, used at pH levels where they are most effective. This will generally be in a pH range from about 7.0 to about 8.0. Such treatments may be carried out in conjunction with the regular purification and in general do not extend the time of treatment.

The procedure used in the examples gives a product of substitution of 0.6 to 0.7 hydroxyl group per anhydroglucose unit of cellulose. However, the method according to this invention is equally good in the preparation of low-viscosity products of other substitutions.

Although the examples illustrate preparation of carboxymethylcellulose the invention is applicable to the preparation of any carboxyalkyl cellulose insoluble in the alcohols used as the reaction medium. Other carboxyalkyl ethers, such as carboxyethylcellulose, carboxypropylcellulose, carboxybutylcellulose, and substituted variations in the alkyl group of the ethers mentioned are, for example, prepared in a similar fashion. The primary reaction product is usually the alkali-metal salt of the carboxyalkyl cellulose, since the reaction is carried out in a strongly alkaline solution. The free acid is in each case readily obtained by treating the primary product with a mineral acid. Other salts are readily prepared from the free acid.

The invention is particularly effective in regulating the viscosity of carboxyalkyl ethers of cellulose prepared by the slurry or fibrous process. However, it may also be applied with effectiveness to the control of viscosity in the preparation of other cellulose ethers such as ethyl cellulose, benzyl cellulose, propyl cellulose, etc., and to the control of viscosity in the preparation of carboxyalkyl ethers made by processes other than the slurry or fibrous process, i. e., by eliminating the inert diluent.

By the process of the present invention carboxyalkyl ethers having a desired final viscosity are obtained by incorporating with the etherification mixture predetermined amounts of a peroxide-forming compound and a metal. The process is simple, effective and economical and permits the use of different types of cellulose having variable viscosities. Viscosity regulation is attained during the regular manufacturing process, thereby eliminating costly pretreatments of the cellulose and the necessity of using cellulose of a certain viscosity in order to produce a desired product viscosity.

What we claim and desire to protect by Letters Patent is:

1. In the preparation of a cellulose ether by a reaction mixture of alkali and cellulose with an etherifying agent, the improvement which comprises regulating the viscosity of the cellulose ether by introducing into the reaction mixture a predetermined amount of a substance of the group consisting of hydrogen peroxide and metallic peroxides, and a predetermined amount of a salt of a metal of the group consisting of manganese, cobalt, iron and lead, and conducting said reaction in the presence thereof.

2. In the preparation of a carboxyalkyl ether of cellulose by a reaction mixture of alkali and cellulose with a carboxyalkylating agent, the improvement which comprises regulating the viscosity of the carboxyalkyl ether of cellulose by introducing into the reaction mixture a predetermined amount of a substance of the group consisting of hydrogen peroxide and metallic peroxides, and a predetermined amount of a salt of a metal of the group consisting of manganese, cobalt, iron and lead, and conducting said reaction in the presence thereof.

3. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture a predetermined amount of a substance of the group consisting of hydrogen peroxide and metallic peroxides, and a predetermined amount of a salt of a metal of the group consisting of manganese, cobalt, iron and lead, and conducting said reaction in the presence thereof.

4. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture a predetermined amount of a substance of the group consisting of hydrogen peroxide and metallic peroxides, said peroxide material being present in an amount equivalent to about 0.03 to about 15% expressed as per cent hydrogen peroxide based on the cellulose, and an amount of a salt of a metal of the group consisting of manganese, cobalt, iron and lead equivalent to about 0.01 to about 200 parts per million of said metal based on the cellulose, and conducting said reaction in the presence thereof.

5. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture a predetermined amount of a substance of the group consisting of hydrogen peroxide and metallic peroxides, said peroxide material being present in an amount equivalent to about 0.03 to about 15% expressed as per cent hydrogen peroxide based on the cellulose, and an amount of a soluble manganese salt equivalent to about 0.01 to about 200 parts per million of manganese metal based on the cellulose, and conducting said reaction in the presence thereof.

6. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture a predetermined amount of a substance of the group consisting of hydrogen peroxide and metallic peroxides, said peroxide material being present in an amount equivalent to about 0.03 to about 15% expressed as per cent hydrogen peroxide based on the cellulose, and an amount of a soluble cobalt salt equivalent to about 0.01 to about 200 parts per million of cobalt metal based on the cellulose, and conducting said reaction in the presence thereof.

7. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture a predetermined amount of a substance of the group consisting of hydrogen peroxide and metallic peroxides, said peroxide material being present in an amount equivalent to about 0.03 to about 15% expressed as per cent hydrogen peroxide based on the cellulose, and an amount of a soluble iron salt equivalent to about 0.01 to about 200 parts per million of iron metal based on the cellulose, and conducting said reaction in the presence thereof.

8. In the preparation of a carboxyalkyl ether of cellulose by a reaction mixture of alkali and cellulose with a carboxyalkylating agent in the presence of an inert diluent, the improvement which comprises regulating the viscosity of the carboxyalkyl ether of cellulose by introducing into the reaction mixture 0.03 to about 15% of hydrogen peroxide based on the cellulose, and an amount of a salt of a metal of the group consisting of manganese, cobalt, iron and lead equivalent to about 0.01 to about 200 parts per million of said metal based on the cellulose, and conducting said reaction in the presence thereof.

9. A process in accordance with claim 8 in which the carboxyalkyl ether of cellulose is carboxymethylcellulose.

EUGENE D. KLUG.
HAROLD M. SPURLIN.

REFERENCES CITED

The following references are of record in the file of this patent:

UNITED STATES PATENTS

| Number | Name | Date |
|---|---|---|
| 1,860,431 | Richter | May 31, 1932 |
| 2,112,116 | Richter | Mar. 22, 1938 |
| 2,141,721 | Meinel | Dec. 27, 1938 |
| 2,327,911 | Lilienfeld | Aug. 24, 1943 |

FOREIGN PATENTS

| Number | Country | Date |
|---|---|---|
| 479,445 | Great Britain | Feb. 7, 1938 |
| 518,197 | Great Britain | Feb. 20, 1940 |